US012462789B2

(12) United States Patent
Kaur et al.

(10) Patent No.: US 12,462,789 B2
(45) Date of Patent: Nov. 4, 2025

(54) LANGUAGE DETECTION SYSTEM FOR A VEHICLE

(71) Applicant: GM Global Technology Operations LLC, Detroit, MI (US)

(72) Inventors: Prabhjot Kaur, Auburn Hills, MI (US); Noah Sharkus, Grosse Ile, MI (US); Nicholas Constantine Sidiropoulos, Fraser, MI (US); Gaurav Talwar, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 197 days.

(21) Appl. No.: 18/492,436

(22) Filed: Oct. 23, 2023

(65) Prior Publication Data

US 2025/0131912 A1    Apr. 24, 2025

(51) Int. Cl.
*G10L 15/00* (2013.01)
*G10L 15/22* (2006.01)

(52) U.S. Cl.
CPC ............ *G10L 15/005* (2013.01); *G10L 15/22* (2013.01)

(58) Field of Classification Search
CPC ............................... G10L 15/005; G10L 15/22
USPC ............................................................ 704/8
See application file for complete search history.

(56) References Cited

U.S. PATENT DOCUMENTS

| | | | | |
|---|---|---|---|---|
| 11,386,891 B2 * | 7/2022 | Hayashi | .................. | G06F 3/167 |
| 12,334,068 B1 * | 6/2025 | Wang | .................... | G06F 40/279 |
| 2002/0073003 A1 * | 6/2002 | Levine | ............... | G06Q 30/0283 |
| | | | | 709/224 |
| 2003/0167171 A1 * | 9/2003 | Calderone | ........ | H04N 21/42204 |
| | | | | 704/275 |
| 2007/0094033 A1 * | 4/2007 | Nagashima | ............. | G10L 15/22 |
| | | | | 704/E15.04 |
| 2008/0177541 A1 * | 7/2008 | Satomura | ................ | G10L 15/22 |
| | | | | 704/E15.044 |
| 2009/0326914 A1 * | 12/2009 | Joy | ........................ | G06F 40/129 |
| | | | | 704/3 |
| 2012/0035932 A1 * | 2/2012 | Jitkoff | ................ | G01C 21/3608 |
| | | | | 704/254 |
| 2014/0297287 A1 * | 10/2014 | Newman | ................. | G10L 25/93 |
| | | | | 704/275 |

(Continued)

FOREIGN PATENT DOCUMENTS

DE    10045020 A1    5/2001

*Primary Examiner* — Thuykhanh Le
(74) *Attorney, Agent, or Firm* — Honigman LLP; Matthew H. Szalach; Jonathan P. O'Brien

(57) ABSTRACT

A language detection system includes data processing hardware and memory hardware in communication with the data processing hardware. The memory hardware stores instructions that when executed on the data processing hardware cause the data processing hardware to perform operations. The operations include issuing a vehicle prompt and determining responsiveness to the issued vehicle prompt, the responsiveness including an execution response and anonresponsive response. A language monitoring module is activated in response to the non-responsive response of the determined responsiveness and a spoken language is monitored within an interior cabin of a vehicle. A driver state is estimated based on the determined language, and a translation function is executed using a translation module in response to the estimated driver state.

20 Claims, 5 Drawing Sheets

(56) References Cited

U.S. PATENT DOCUMENTS

| | | | |
|---|---|---|---|
| 2015/0039108 A1* | 2/2015 | Paik | G06F 3/167 |
| | | | 700/94 |
| 2015/0344040 A1* | 12/2015 | Heckmann | B60W 50/14 |
| | | | 701/1 |
| 2017/0160813 A1* | 6/2017 | Divakaran | G10L 15/22 |
| 2017/0329494 A1* | 11/2017 | Zhong | G06Q 10/1095 |
| 2018/0218047 A1* | 8/2018 | Yamashita | G06F 16/24564 |
| 2018/0253344 A1* | 9/2018 | Deligia | G06F 16/164 |
| 2018/0268808 A1* | 9/2018 | Song | G10L 15/22 |
| 2018/0314689 A1* | 11/2018 | Wang | G10L 15/1822 |
| 2018/0325470 A1* | 11/2018 | Fountaine | G08B 21/0446 |
| 2019/0080691 A1* | 3/2019 | Meng | G06F 9/454 |
| 2020/0241824 A1* | 7/2020 | Lee | G06F 3/013 |
| 2020/0243094 A1* | 7/2020 | Thomson | G10L 15/28 |
| 2020/0339137 A1* | 10/2020 | Darnaud | B60W 40/08 |
| 2020/0349933 A1* | 11/2020 | Wolff | G10L 25/78 |
| 2021/0210068 A1* | 7/2021 | Zhang | G10L 15/07 |
| 2021/0304755 A1* | 9/2021 | Sumida | G10L 15/26 |
| 2021/0331689 A1* | 10/2021 | Heo | B60K 35/80 |
| 2021/0357177 A1* | 11/2021 | Heo | B60K 35/81 |
| 2021/0374442 A1* | 12/2021 | Wright | B60R 11/0247 |
| 2021/0394716 A1* | 12/2021 | Bader | B60R 25/24 |
| 2022/0036888 A1* | 2/2022 | Furukawa | G06F 16/3329 |
| 2022/0360963 A1 | 11/2022 | Ferentz et al. | |
| 2022/0415321 A1* | 12/2022 | Jung | G10L 15/22 |
| 2023/0004342 A1* | 1/2023 | Trestain | H04R 3/04 |
| 2023/0041105 A1* | 2/2023 | Santucci | G10L 15/30 |
| 2023/0096543 A1* | 3/2023 | Moy | G06F 40/58 |
| | | | 704/3 |
| 2023/0112797 A1* | 4/2023 | Sicconi | G06V 10/46 |
| | | | 705/26.7 |
| 2023/0223019 A1* | 7/2023 | Ochiai | G10L 25/63 |
| | | | 704/275 |
| 2023/0247309 A1* | 8/2023 | Somanath | B60R 1/22 |
| | | | 348/148 |
| 2023/0325611 A1* | 10/2023 | Garg | G06F 40/58 |
| 2024/0070251 A1* | 2/2024 | Maizels | G10L 13/02 |
| 2024/0127813 A1* | 4/2024 | Gao | G06F 9/542 |
| 2024/0300532 A1* | 9/2024 | Minami | G10L 15/22 |
| 2024/0362955 A1* | 10/2024 | Stone | G07C 5/008 |
| 2024/0371371 A1* | 11/2024 | Balasubramanian | |
| | | | G10L 15/063 |
| 2024/0386893 A1* | 11/2024 | Yu | G06F 21/32 |
| 2025/0037712 A1* | 1/2025 | Feilen | G06N 20/00 |
| 2025/0061896 A1* | 2/2025 | Shires | G10L 17/00 |
| 2025/0095633 A1* | 3/2025 | Yu | G10L 15/22 |
| 2025/0157466 A1* | 5/2025 | Sunaga | G10L 15/10 |

\* cited by examiner

LANGUAGE DETECTION SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a language detection system for a vehicle.

Vehicles are often incorporated with assisted driving features. The assisted driving features may be configured with speech functions to provide assistance to a driver of the vehicle. The speech function may be programmed using a predetermined language as part of a controller of the vehicle. In some scenarios, the speech function may be utilized to guide a driver through operations of the vehicle. The controller of the vehicle may assess a readiness of the driver to execute operations, which may be performed using the predetermined language. In some instances, the predetermined language of the controller may be different than a primary language of the driver.

SUMMARY

In some aspects, a computer-implemented method when executed by data processing hardware causes the data processing hardware to perform operations. The operations include issuing a vehicle prompt and determining a responsiveness to the issued vehicle prompt. The responsiveness includes an execution response and a non-responsive response. A language monitoring module is activated in response to the non-responsive response of the determined responsiveness. A spoken language is monitored within an interior cabin of a vehicle and a language of the monitored spoken language is determined. A driver state is estimated based on the determined language, and a translation function is executed using a translation module in response to the estimated driver state.

In some examples, the language of the monitored spoken language may be determined by receiving a language translation from a server. The translation function may be executed by updating the vehicle prompt with the language translation. In some examples, the translation function may be executed by offering in-vehicle training using the language translation. The operations may include determining a severity of a vehicle event and issuing a secondary vehicle prompt using the determined language. A communication server may be contacted and a translation service may be executed via the communication server. The severity of the vehicle event may be determined by in-cabin data being collected.

In other aspects, a language detection system includes data processing hardware and memory hardware in communication with the data processing hardware. The memory hardware stores instructions that when executed on the data processing hardware cause the data processing hardware to perform operations. The operations include issuing a vehicle prompt and determining responsiveness to the issued vehicle prompt, the responsiveness including an execution response and anon-responsive response. A language monitoring module is activated in response to the non-responsive response of the determined responsiveness and a spoken language is monitored within an interior cabin of a vehicle. A driver state is estimated based on the determined language, and a translation function is executed using a translation module in response to the estimated driver state.

In some examples, the language of the monitored spoken language may be determined by receiving a language translation from a server. The translation function may be executed by updating the vehicle prompt with the language translation. In some examples, the translation function may be executed by offering in-vehicle training using the language translation. The operations may include determining a severity of a vehicle event and issuing a secondary vehicle prompt using the determined language. A communication server may be contacted and a translation service may be executed via the communication server. The severity of the vehicle event may be determined by in-cabin data being collected.

In yet other aspects, a computer-implemented method when executed by data processing hardware causes the data processing hardware to perform operations. The operations include issuing a vehicle prompt and determining responsiveness to the issued vehicle prompt. The responsiveness includes an execution response and a non-responsive response. A spoken language is monitored within an interior cabin of a vehicle, and a language monitoring module is activated in response to the monitored spoken language and the determined responsiveness including the non-responsive response. A driver state is estimated based on the determined language, and a language translation is generated on a server. The operations also include executing a translation module using the generated language translation in response to the estimated driver state.

In some examples, generating the language translation may include utilizing artificial intelligence to generate the language translation. The driver state may be estimated by collecting in-cabin data. In some instances, one or more secondary vehicle prompts may be displayed using the generated language translation as part of executing the translation function. In some configurations, in-vehicle training may be offered using the generated language translation. The estimated driver state may include an emergency state being estimated, and a third party server may be contacted as part of the executed translation function.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
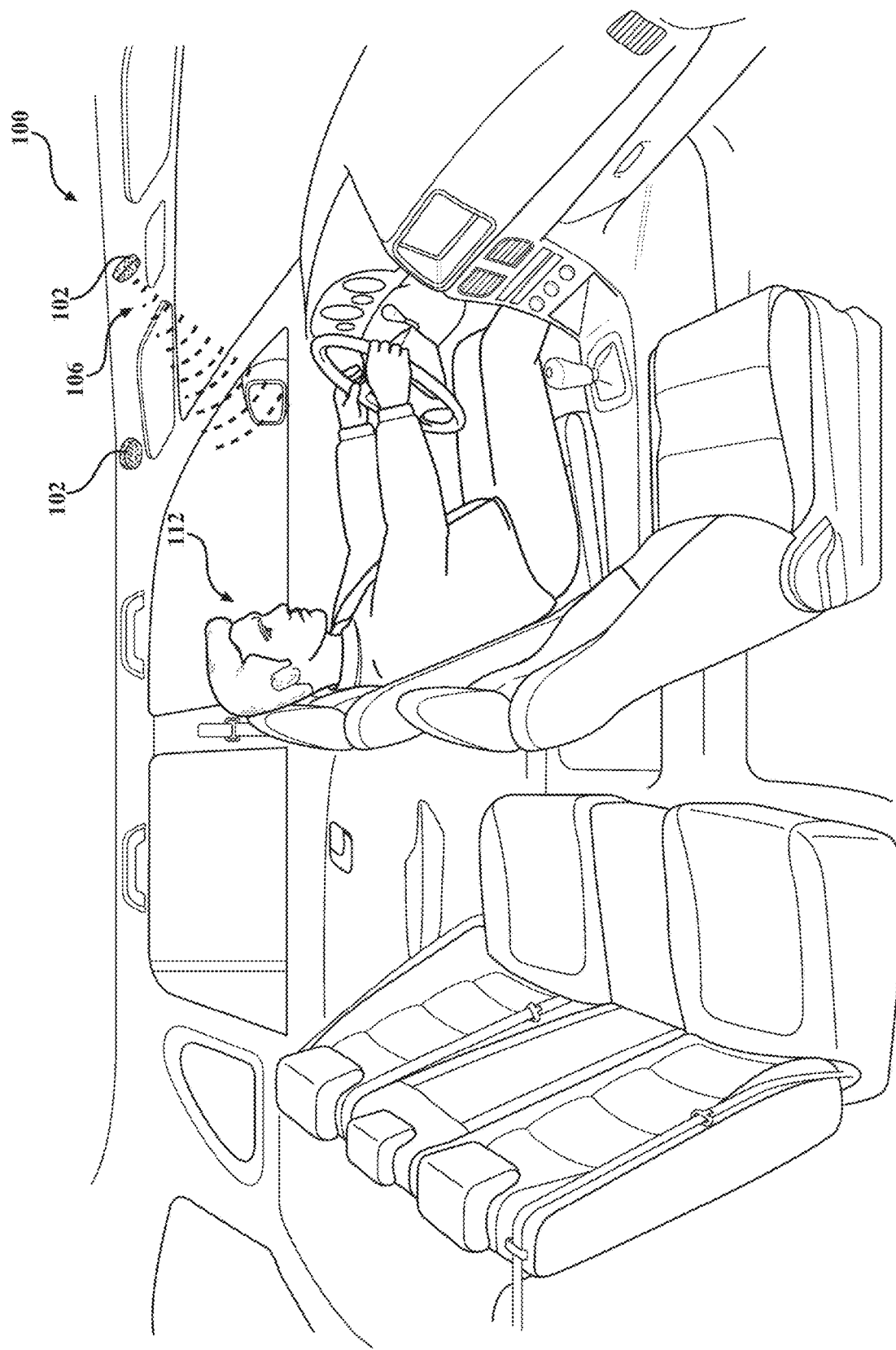
FIG. 1 is a partial perspective view of an interior of a vehicle according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-9, a language detection system 10 is integrated with a vehicle 100. The language detection system 10 is configured to interconnect a vehicle processor 12 and a server 200, as described below. The vehicle processor 12 is configured to execute a language monitoring module 14, described herein. The vehicle 100 may be equipped with a sensor array 102 configured to capture audio signals 16 within an interior cabin 104 of the vehicle 100.

The vehicle processor 12 includes data processing hardware 18 and memory hardware 20 that is in communication with the data processing hardware 18. The data processing hardware 18 is configured to receive the audio signals 16 from the sensor array 102. It is generally contemplated that the language detection system 10 includes a computer-implemented method that is executed by the data processing hardware 18 and causes the data processing hardware 18 to perform various operations, described herein. Additionally or alternatively, the memory hardware 20 may store the computer-implemented method as an instruction that, when executed on the data processing hardware 18, causes the data processing hardware 18 to perform the operations described herein.

Figure 2:
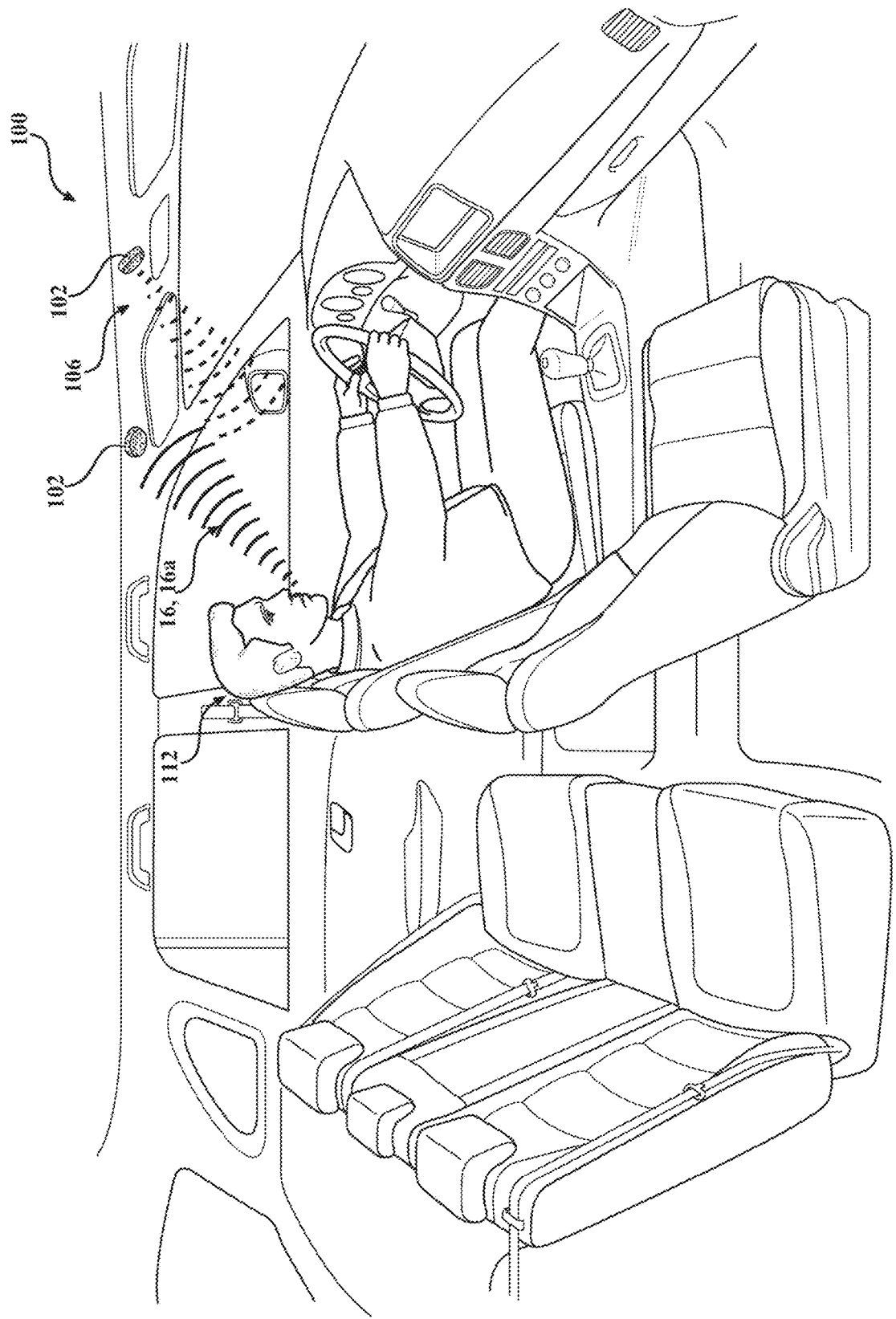
FIG. 2 is a partial perspective view of an interior of a vehicle with a language detection system according to the present disclosure.
Figure 3:
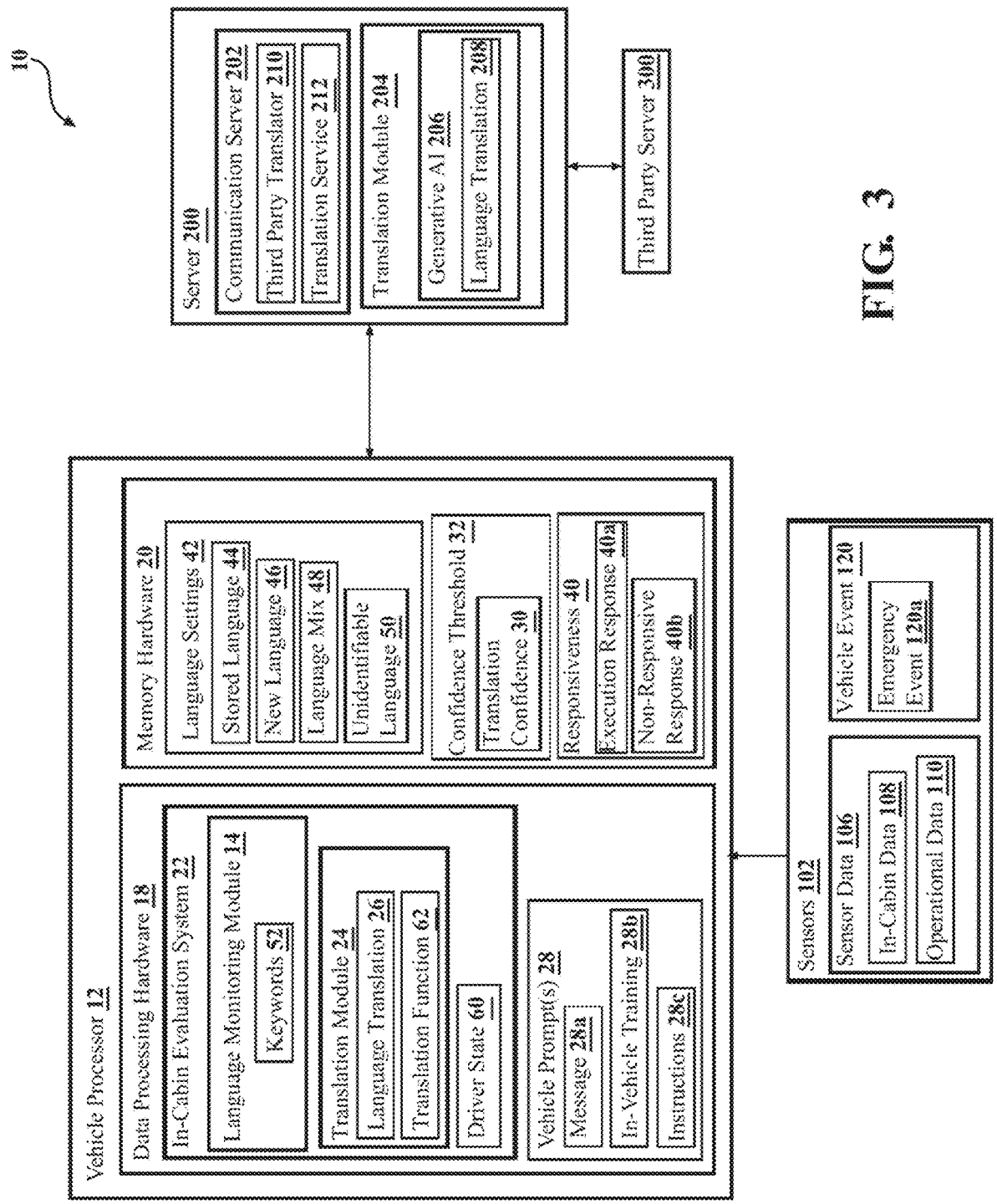
FIG. 3 is a functional block diagram of a language detection system according to the present disclosure.
Figure 4:
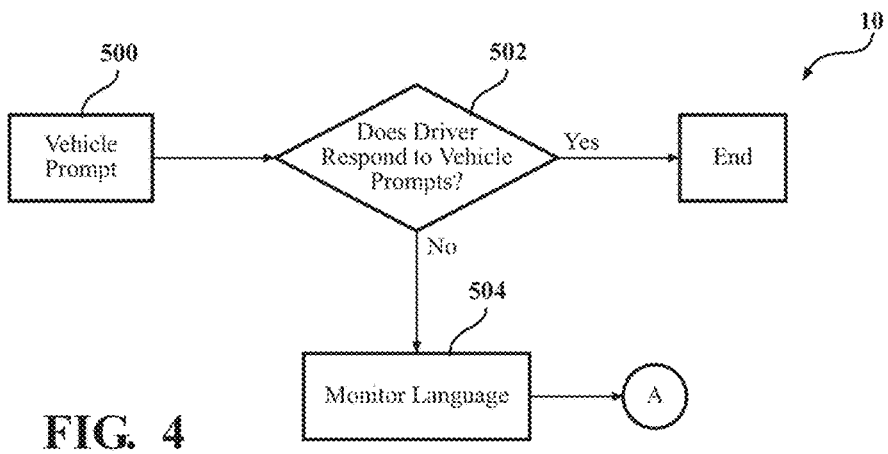
FIG. 4 is an example flow diagram for a language detection system according to the present disclosure, the language detection system monitoring in-cabin spoken language.
Figure 5:
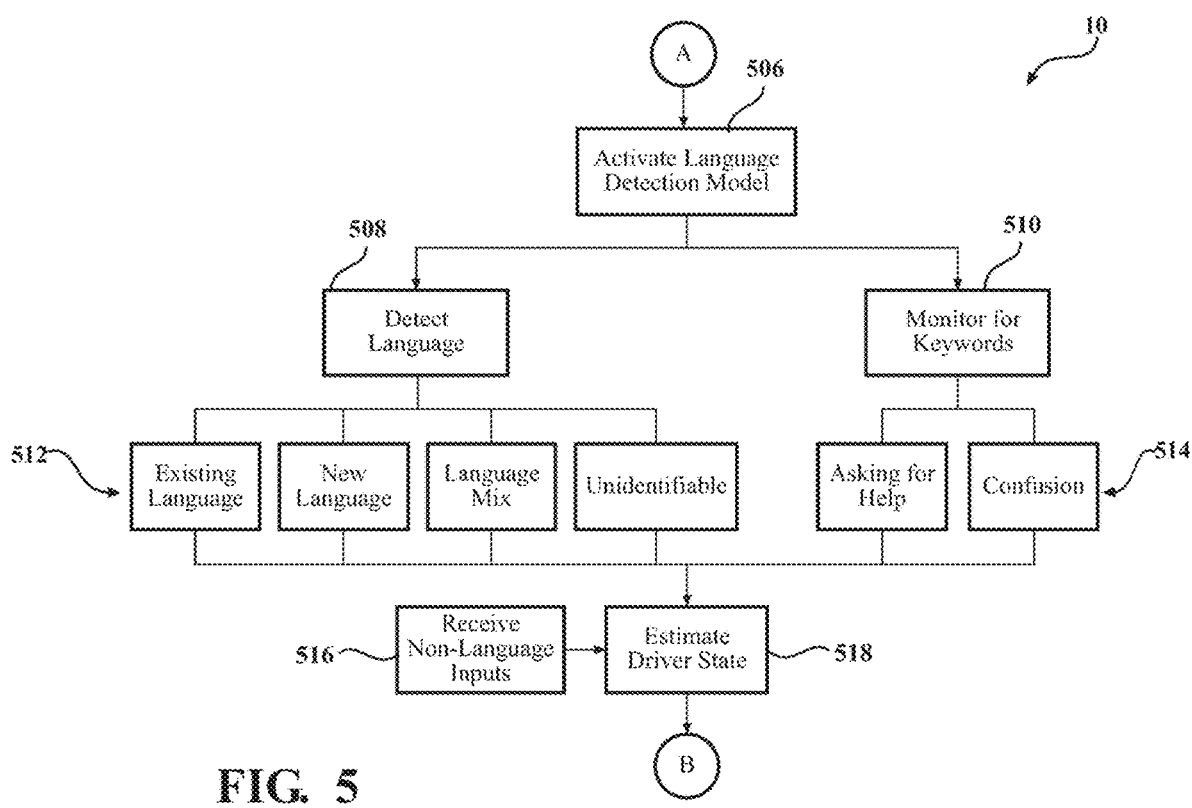
FIG. 5 is an example flow diagram for the language detection system of FIG. 4, the language detection system detecting language type and driver state.
Figure 6:
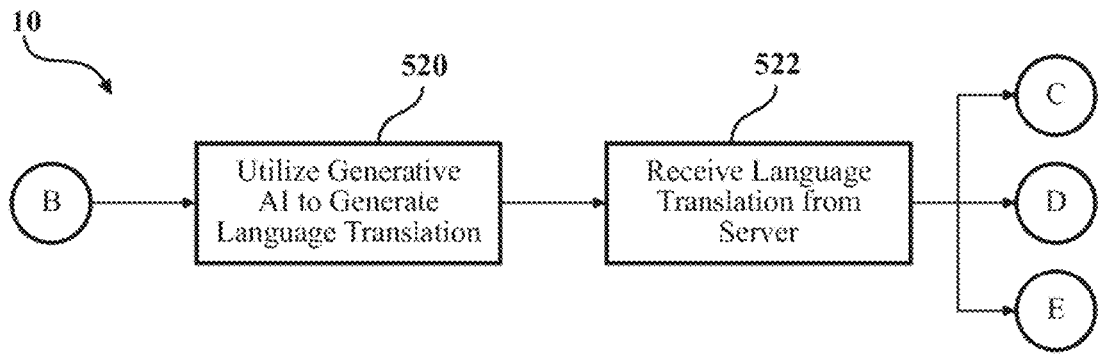
FIG. 6 is an example flow diagram for the language detection system of FIG. 5, the language detection system utilizing language translation techniques.

Referring to FIGS. 1-3, the language monitoring module 14, as described herein, is configured to monitor a spoken language within the interior cabin 104 of the vehicle 100 via the sensor array 102. For example, the audio signals 16 may include a spoken language 16a detected from within the vehicle 100 and may be communicated with the vehicle processor 12 as sensor data 106. The sensor data 106 also includes in-cabin data 108 and operational data 110. The in-cabin data 108 may include, in addition to the audio signals 16, image data that may be captured via image sensors of the sensor array 102. The operational data 110 may include movement of a steering wheel, propulsion of the vehicle 100, lane transitions, and any other operative function of the vehicle 100. The operational data 110 may also be detected by the sensor array 102. While the operational data 110 may be detected by the sensor array 102, it is also contemplated that the vehicle processor 12 may independently determine at least some operational data 110 in addition to the operational data 110 received from the sensor array 102.

As mentioned above, the in-cabin data 108 includes the audio signals 16 captured by the sensor array 102. The sensor array 102 may include, but is not limited to, a microphone array that captures the audio signals 16 and transmits the audio signals 16 to the language detection system 10. The sensor array 102 receives the audio signals 16 and transmits the audio signals 16 to the vehicle processor 12. The vehicle processor 12, in response to receiving the audio signals 16, may initiate the language monitoring module 14 and may, for example, execute the computer-implemented method of the language detection system 10.

The vehicle processor 12 includes an in-cabin evaluation system 22 that is configured to execute the language monitoring module 14. The in-cabin evaluation system 22 is also configured with a translation module 24. The translation module 24 is described in more detail below and receives the audio signals 16 that are monitored by the language monitoring module 14. The in-cabin evaluation system 22 may communicate a language translation 26 with an occupant and/or driver 112 of the vehicle 100. The vehicle processor 12 is configured to issue various vehicle prompts 28 during operation of the vehicle 100. As described herein, the language monitoring module 14 monitors a spoken language 16a within the vehicle 100, and the language detection system 10 is configured to reconfigure the vehicle prompt 28 with the language translation 26 to improve communication with the driver 112.

Referring still to FIGS. 1-3, the language detection system 10 interconnects the vehicle processor 12 with the server 200. The server 200 includes a communication server 202 and a translation module 204. The language detection system 10 is configured to utilize the translation module 204 of the server 200 if a translation confidence 30 of the translation module 24 of the in-cabin evaluation system 22 is below a confidence threshold 32. For example, the confidence threshold 32 may be approximately ninety-five (95) percent confidence to utilize the in-cabin evaluation system 22 to translate the vehicle prompt 28. The language detection system 10 is configured to determine the translation confidence 30 based on the sensor data 106 to determine responsiveness to the translated vehicle prompt 28.

The language detection system 10 utilizes the translation module 204 of the server 200 when the language detection system 10 determines that the translation confidence 30 of the in-cabin evaluation system 22 is below the confidence threshold 32. The translation module 204 of the server 200 may utilize generative artificial intelligence (AI) 206 to generate a language translation 208. The translation module 204 receives the audio signals 16, and the generative AI 206 generates the translated vehicle prompts 28 using the generated language translation 208. In some instances, the server 200 may also utilize the communication server 202 to connect a third party translator 210 with the driver 112 of the vehicle 100 to assist in communicating the vehicle prompt 28, as described in more detail below.

With further reference to FIGS. 1-3, the language detection system 10 may further interconnect the server 200 with a third party server 300. The third party server 300 is configured to provide emergency assistance with the occupant(s) 112 of the vehicle 100. The server 200 may provide the generated language translation 208 to the third party server 300 to assist in communication between the third party server 300 and the occupant(s) 112. The language detection system 10 is configured to distinguish between languages spoken within the interior cabin 104 of the vehicle 100, such that the language detection system 10 may identify a location within the vehicle 100 of each respective speaker.

For example, the language detection system 10 is configured to monitor the audio signals 16 and identify a speaker, which may be the driver 112. The language detection system 10 may also distinguish between multiple speakers 112 speaking at the same time to identify the spoken language 16a from the audio signals 16. The language detection system 10 may also identify the spoken language 16a if the speaker 112 is utilizing a voice calling feature of the vehicle 100 or otherwise utilizing voice activated functions within the vehicle 100. The language detection system 10 interconnects the vehicle processor 12, the server 200, and in some instances, the third party server 300 to maximize the translation assistance provided to the speaker 112.

With reference now to FIGS. 2-5, the vehicle processor 12 is configured to issue various vehicle prompts 28 during operation of the vehicle 100. The vehicle prompts 28 may be issued via audio within the interior cabin 104 and/or via text on an infotainment device of the vehicle 100. The vehicle prompts 28 may include, but are not limited to, messages 28a, in-vehicle training 28b, and/or instructions 28c. The vehicle processor 12 is configured to monitor a responsiveness 40 of the driver 112 to the vehicle prompt 28 via the language monitoring module 14 and the in-cabin evaluation system 22. The responsiveness 40 may include an execution response 40a and a non-responsive response 40b. If the vehicle processor 12 detects the execution response 40a, the language detection system 10 may continue to monitor and operate in a background of the vehicle processor 12. However, if the non-responsive response 40b is detected, then the language detection system 10 may trigger the vehicle processor 12 to execute the in-cabin evaluation system 22.

It is generally contemplated that the language monitoring module 14 of the vehicle processor 12, and the language detection system 10 as a whole, is operative during operation of the vehicle 100 regardless of the responsiveness 40. The language detection system 10 may gather data, including the audio signals 16, for future use. For example, the memory hardware 20 of the vehicle processor 12 may store language settings 42 that may be refined based on the background operations of the language detection system 10. The language settings 42 are based on the audio signals 16 detected, which may be categorized as a stored language 44, a new language 46, a language mix 48, and/or an unidentifiable language 50. The language settings 42 may be updated using the audio signals 16 and the translation module 24 of the in-cabin evaluation system 22. In some examples, the language settings 42 may be updated by the server 200 via the translation module 204. In particular, the language detection system 10 may utilize either of the translation modules 24, 204 when the audio signals 16 are categorized as an unidentifiable language 50 by the in-cabin evaluation system 22.

When the vehicle processor 12 receives the audio signals 16, the vehicle processor 12 executes the language monitoring module 14. The language detection system 10 may utilize the language monitoring module 14 to identify keywords 52. For example, the language monitoring module 14 may identify keywords 52 in response to the vehicle prompt 28 to determine whether the occupant 112 understood the vehicle prompt 28. The keywords 52 may assist the vehicle processor 12 in determining the responsiveness 40 of the occupant 112. Accordingly, the language monitoring module 14 may be continuously operable during operation of the vehicle 100. The language detection system 10 may selectively execute the in-cabin evaluation system 22 in response to the non-responsive response 40b to the vehicle prompt 28.

With continued reference to FIGS. 2-5, the language detection system 10 may be activated in response to the non-responsive response 40b. In other examples, the language monitoring module 14 may be continuously running in the background and may be positively activated in response to the non-responsive response 40b. The language monitoring module 14 is configured to detect the spoken language and monitor for the keywords 52. The keywords 52 may include asking for assistance or may be indicators of confusion in response to the vehicle prompt 28. In some examples, the in-cabin evaluation system 22 utilizes the detected language from the language monitoring module 14 to estimate a driver state 60. For example, the language monitoring module 14 identifies the spoken language 16a based on the language settings 42. The in-cabin evaluation system 22 may also utilize non-language inputs from the in-cabin data 108 received as part of the sensor data 106 to further assist in estimating the driver state 60. The driver state 60 may thus be estimated by collecting the in-cabin data 108.

The in-cabin evaluation system 22 is configured to execute a translation based on one or more of the audio signals 16 and the keywords 52. The server 200 may be utilized to supplement and enrich the confidence probability of the in-cabin evaluation system 22 in the event that the translation confidence 30 of the in-cabin evaluation system 22 is low. Thus, the language detection system 10 may utilize a hybrid arrangement with the vehicle processor 12 and the server 200 in cooperative operation. It is further contemplated that, in some examples, the server 200 may utilize crowd sourcing to further adapt and refine the confidence threshold 32 over time to continuously improve the language detection system 10. As described herein, the language detection system 10 ultimately provides an updated vehicle prompt 28 in the language determined to be understood by the occupant 112.

Referring to FIGS. 2-6, the language detection system 10 is configured to execute a translation function 62 in response to the estimated driver state 60. The translation function 62 may incorporate the language translation 26 from either the in-cabin evaluation system 22 and/or the server 200. For example, the vehicle processor 12 may receive the language translation 26 from the server 200, which may be generated using the generative AI 206. The driver state 60 is estimated using the various sensor data 106 to determine why the responsiveness 40 of the occupant 112 was a non-responsive response 40b. In some examples, the occupant 112 or driver 112, may not understand the vehicle prompt 28. In response, the language detection system 10 may update the vehicle prompt 28 with the language translation 26 and issue the translated vehicle prompt 28.

In other examples, the language detection system 10 may provide one or more secondary vehicle prompts 28 using the language translation 26. The secondary vehicle prompt 28 may include, but is not limited to, the in-vehicle training 28b in the language translation. For example, the in-vehicle training 28b may assist the driver 112 in further understanding the vehicle prompt 28 by also presenting the in-vehicle training 28b in the language translation. As mentioned above, the secondary vehicle prompts 28 may also utilize displayed messages 28a and/or instructions 28c utilizing the language translation.

With reference again to FIGS. 1-9, the language detection system 10 may determine that the driver 112 has a non-responsive response 40b to critical commands issued as part of the vehicle prompt 28. The language detection system 10 may display additional, secondary vehicle prompts 28 in the translated language in addition to projecting the vehicle prompt 28 in the translated language. If the language detection system 10 still determines a non-responsive response 40b after the additional vehicle prompts 28, the language detection system 10 initiates contact between the vehicle processor 12 and the communication server 202. The communication server 202 may connect a third party translator 210 with the driver 112 to assist in communicating the information presented as part of the vehicle prompt 28.

The language detection system 10 utilizes the audio signals 16 and language translation to identify the third party translator 210 that speaks the identified spoken language 16a. The server 200 is configured to connect the third party translator 210 via the communication server 202 to assist the driver 112 in understanding the vehicle prompts 28. In some examples, the vehicle processor 12 is configured to determine a severity of a vehicle event 120 and may issue the secondary vehicle prompt 28 based on the severity of the vehicle event 120.

The severity of the vehicle event 120 may be determined, at least in part, by the in-cabin data 108 received from the sensor array 102. Based on the severity of the vehicle event 120, the language detection system 10 may contact the communication server 202 to execute a translation service 212 via the third party translator 210. In some instances, the severity of the vehicle event 120 may be determined to be an emergency event 120a. The language detection system 10 may, via the server 200, contact the third party server 300 to provide assistance to the driver 112.

In the example of an emergency event 120a, the language detection system 10 may communicate with the third party server 300 the detected language and the translated language data. The third party server 300 may coordinate emergency services utilizing the translation data to assist in communicating with the driver 112. In some examples, the third party server 300 may cooperate with the communication server 202 to utilize the third party translator 210 to communicate with the driver 112. Thus, the server 200 may share the translation data with the third party server 300.

Referring still to FIGS. 1-9, an example of the computer-implemented method of the language detection system 10 is described with particular reference to FIGS. 4-9. At 500, the vehicle processor 12 issues a vehicle prompt 28, and the vehicle processor 12, at 502, determines whether the driver 112 responded to the vehicle prompt 28. If the driver 112 responds, then the language detection system 10 is not activated. If the driver 112 does not respond to the vehicle prompt 28, then the vehicle processor 12, at 504, monitors the language spoken in the vehicle 100. The language monitoring module 14 is subsequently or simultaneously activated, at 506, by the vehicle processor 12. The language monitoring module 14, at 508, detects the language and, at 510, monitors for keywords 52. The language monitoring module 14 determines, at 512, whether the detected language is a stored language 44, a new language 46, a language mix 48, and/or an unidentifiable language 50. Similarly, the language monitoring module 14, at 514, may determine whether the keywords 52 detected include asking for assistance or detecting confusion in response to the vehicle prompt 28.

The language detection system 10 may use the detected language and any potential keywords to estimate, at 516, the driver state 60. The language detection system 10 may receive, at 518, non-language inputs as part of the sensor data 106, which may also be utilized in estimating the driver state. The language detection system 10, at 520, may utilize the generative AI 206 to generate a language translation 208, and the vehicle processor 12, at 522, may receive the language translation 208 from the server 200.

Figure 7:
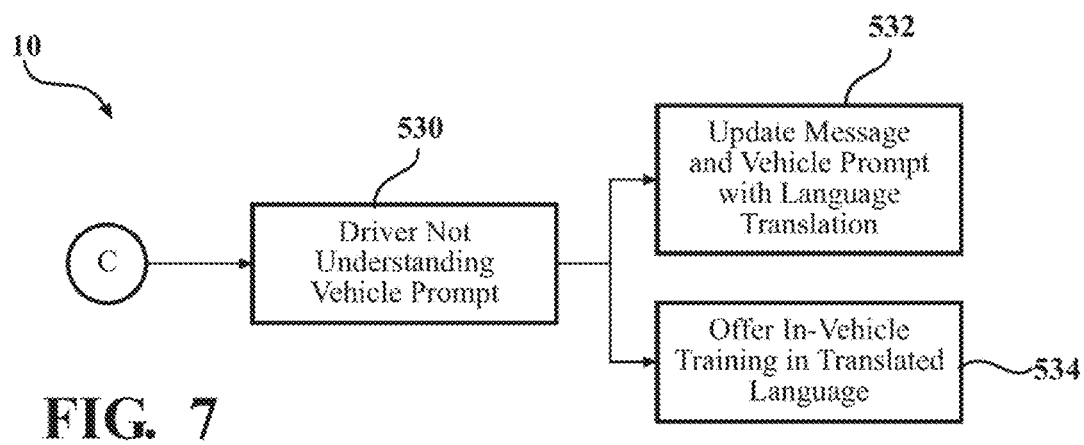
FIG. 7 is an example flow diagram for the language detection system of FIG. 6, the language detection system updating a vehicle language.
Figure 8:
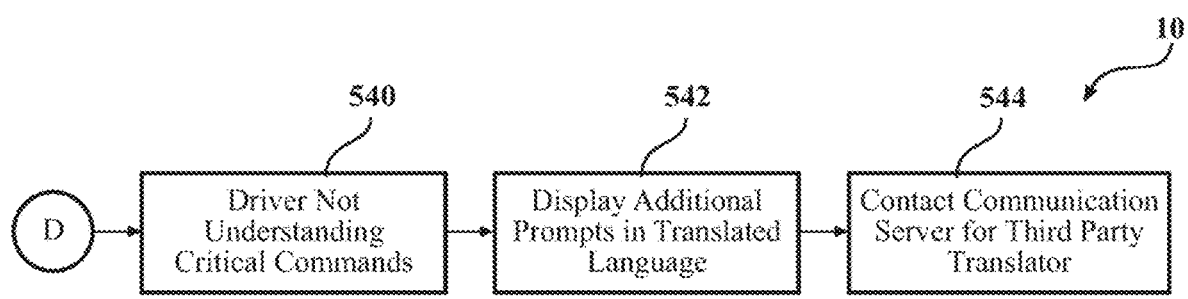
FIG. 8 is an example flow diagram for the language detection system of FIG. 6, the language detection system connecting a driver with a translator.
Figure 9:
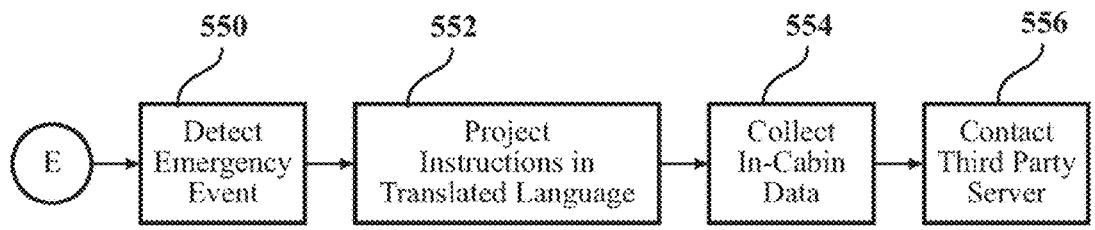
FIG. 9 is an example flow diagram for the language detection system of FIG. 6, the language detection system detecting an event based on a driver state.

With specific reference to FIGS. 7-9, the language detection system 10 may execute different steps depending on the detected scenario. For example, the driver 112, at 530, may not understand the vehicle prompt 28, and the language detection system 10, at 532, may update a message 28a and the vehicle prompt 28 with the language translation 208. The language detection system 10 may also, at 534, offer in-vehicle training 28b using the language translation 208. In other examples, the driver 112, at 540, may not understand critical commands. The language detection system 10 may, at 542, display additional, secondary vehicle prompts 28 using the language translation 208. The language detection system 10, at 544, may also contact the communication server 202 for the third party translator 210. In another example, the language detection system 10, at 550, may detect an emergency event 120. The language detection system 10, at 552, may project instructions 28c using the language translation 208 and may, at 554, collect in-cabin data 108 from the sensor array 102. The language detection system 10, at 556, may also contact the third party server 300 for assistance.

With further reference to FIGS. 1-9, the language detection system 10 advantageously assists in monitoring and translating a spoken language to assist the driver 112 or other occupant 112 within the vehicle 100. The language detection system 10 provides improved communication capabilities between the occupants 112 and the vehicle processor 12, such that a pre-programmed language may be modified by the language detection system 10 in response to a detected non-responsive response 40b to a vehicle prompt 28. Thus, functions of the vehicle processor 12 that may provide assistance to the occupants 112 and/or driver 112 are accounted for despite potential differences in language. The language detection system 10 advantageously provides adaptive language assistance and translation during various assistive functions to maximize the utility of vehicle assist systems.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:
   issuing a vehicle prompt;
   determining responsiveness of a driver to the issued vehicle prompt, the responsiveness including an execution response and a non-responsive response, wherein the execution response includes a response from the driver to the vehicle prompt and wherein the non-responsive response includes a non-response from the driver to the vehicle prompt;
   activating a language monitoring module in response to the non-responsive response of the determined responsiveness;
   listening for a spoken language within an interior cabin of a vehicle;
   determining, using the language monitoring module, a language of the spoken language;
   estimating a state of the driver based on the determined language; and
   executing a translation function using a translation module in response to the estimated state of the driver.

2. The method of claim 1, wherein determining the language of the spoken language includes receiving a language translation from a server.

3. The method of claim 2, wherein executing the translation function includes updating the vehicle prompt with the language translation.

4. The method of claim 2, wherein executing the translation function includes offering in-vehicle training using the language translation.

5. The method of claim 1, further including determining a severity of a vehicle event and issuing a secondary vehicle prompt using the determined language.

6. The method of claim 5, wherein determining the severity of the vehicle event includes contacting a communication server and executing a translation service via the communication server.

7. The method of claim 5, wherein determining the severity of the vehicle event includes collecting in-cabin data.

8. A language detection system for a vehicle, the language detection system comprising:
   data processing hardware; and
   memory hardware in communication with the data processing hardware, the memory hardware storing instructions that when executed on the data processing hardware cause the data processing hardware to perform operations comprising:
   issuing a vehicle prompt;
   determining responsiveness of a driver to the issued vehicle prompt by the processing hardware, the responsiveness including an execution response and a non-responsive response, wherein the execution response includes a response from the driver to the vehicle prompt and wherein the non-responsive response includes a non-response from the driver to the vehicle prompt;
   activating a language monitoring module in response to the non-responsive response of the determined responsiveness;
   listening for a spoken language within an interior cabin of the vehicle;
   determining, using the language monitoring module, a language of the spoken language;
   estimating a state of the driver based on the determined language; and
   executing a translation function in response to the estimated state of the driver.

9. The language detection system of claim 8, wherein determining the language of the spoken language includes receiving a language translation from a server.

10. The language detection system of claim 9, wherein executing the translation function includes updating the vehicle prompt with the language translation.

11. The language detection system of claim 9, wherein executing the translation function includes offering in-vehicle training using the language translation.

12. The language detection system of claim 8, further including determining a severity of a vehicle event and issuing a secondary vehicle prompt using the determined language.

13. The language detection system of claim 12, wherein determining the severity of the vehicle event includes contacting a communication server and executing a translation service via the communication server.

14. The language detection system of claim 12, wherein determining the severity of the vehicle event includes collecting in-cabin data.

15. A computer-implemented method when executed by data processing hardware causes the data processing hardware to perform operations comprising:

issuing a vehicle prompt;

determining responsiveness of a driver to the issued vehicle prompt, the responsiveness including an execution response and a non-responsive response, wherein the execution response includes a response from the driver to the vehicle prompt and wherein the non-responsive response includes a non-response from the driver to the vehicle prompt;

listening for a spoken language within an interior cabin of a vehicle;

activating a language monitoring module in response to the spoken language and the determined responsiveness including the non-responsive response;

determining, using the language monitoring module, a language of the spoken language;

estimating a state of the driver based on the determined language;

generating a language translation on a server; and executing a translation module using the generated language translation in response to the estimated state of the driver.

16. The method of claim 15, wherein generating the language translation includes utilizing artificial intelligence to generate the language translation.

17. The method of claim 15, wherein estimating the state of the driver includes collecting in-cabin data.

18. The method of claim 15, wherein executing the translation function includes displaying one or more secondary vehicle prompts using the generated language translation.

19. The method of claim 18, wherein executing the translation function includes offering in-vehicle training using the generated language translation.

20. The method of claim 18, wherein estimating the state of the driver includes estimating an emergency state and executing the translation function includes contacting a third party server.

* * * * *